Patented Dec. 8, 1925.

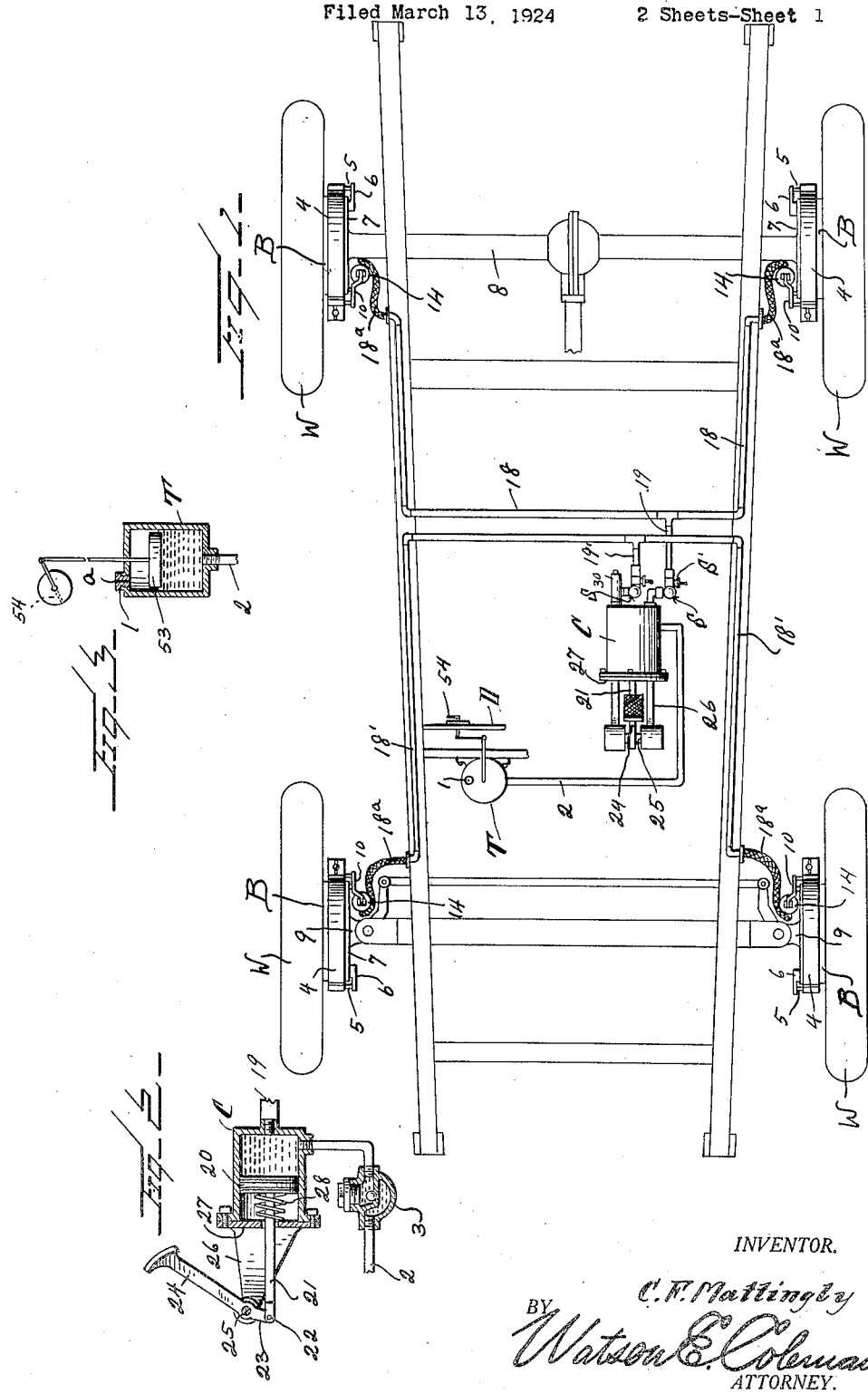

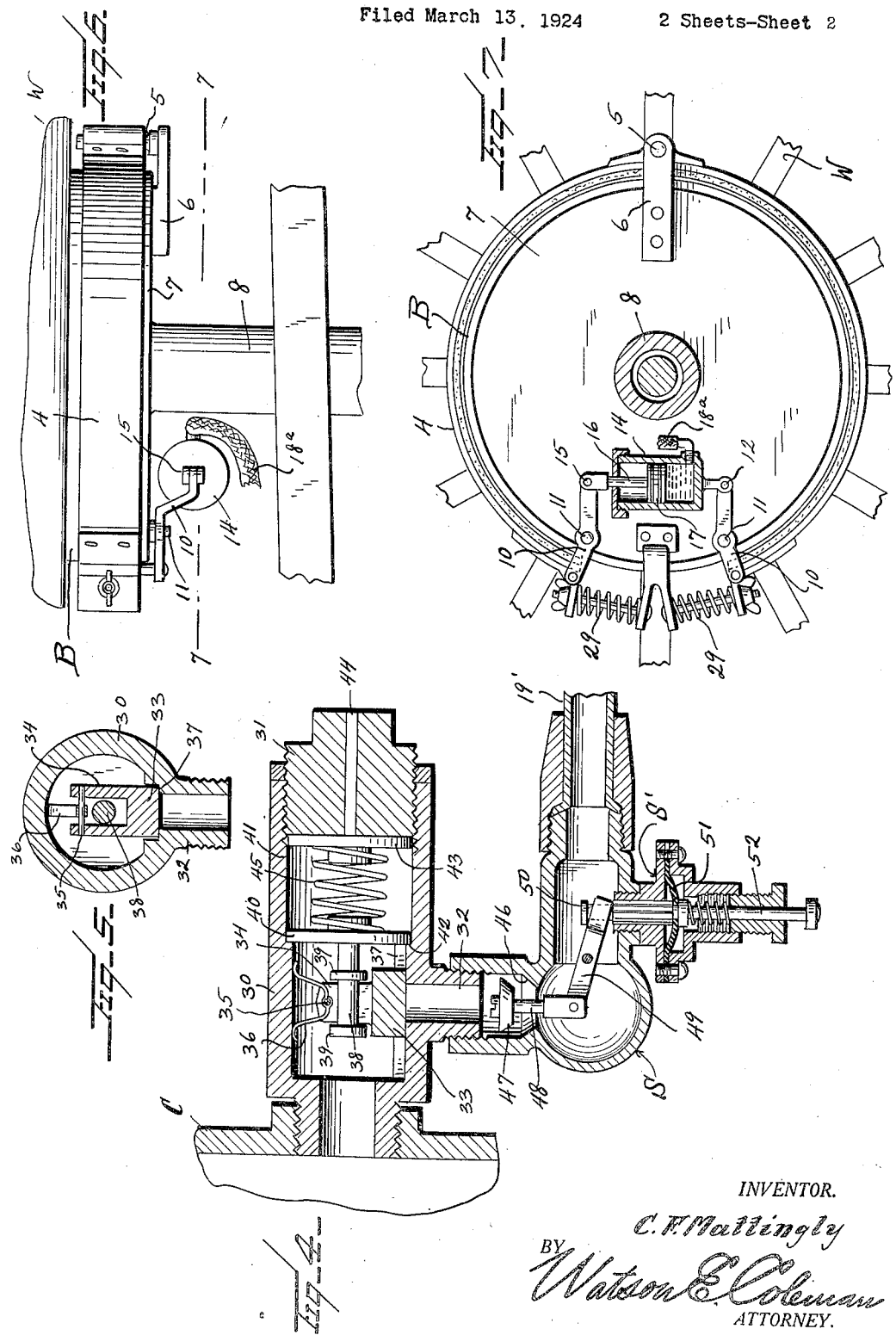

1,564,701

UNITED STATES PATENT OFFICE.

CHARLES F. MATTINGLY, OF ST. LOUIS, MISSOURI, ASSIGNOR TO MATTINGLY AUTOMATIC VALVE COMPANY, OF ST. LOUIS, MISSOURI, A CORPORATION OF MISSOURI.

HYDRAULIC BRAKE.

Application filed March 13, 1924. Serial No. 699,017.

*To all whom it may concern:*

Be it known that I, CHARLES F. MATTINGLY, a citizen of the United States, residing at St. Louis and State of Missouri, have invented certain new and useful Improvements in Hydraulic Brakes, of which the following is a specification, reference being had to the accompanying drawings.

This invention relates to certain improvements in hydraulic brakes and has special relation to a device of this general character especially designed and adapted for use in connection with vehicles and it is an object of the invention to provide a mechanism of this general character embodying novel and improved means whereby braking action is adapted to be effected upon all supporting wheels for a vehicle and wherein certain of the braking units remain inoperative until resistance offered by the remaining units reach a predetermined degree.

Another object of the invention is to provide a novel and improved brake of this general character having an automatic gravity feed or supply system for recharging the cylinders and associated lines to compensate for any loss through leakage or evaporation to eliminate lost motion.

It is also an object of the invention to provide a novel and improved device of this general character embodying a gauge or indicator to record the rise or fall of the fluid at all times within the supply tank.

An additional object of the invention is to provide a device of this general character having a novel and improved control valve to regulate or control the flow from the master cylinder to the braking units associated with certain of the supporting wheels of the vehicle, preferably the front wheels, but which valve does not hinder or interfere with the requisite flow to the remaining brake units.

The invention also has for an object to provide a brake of this general character with novel and improved means to automatically check or stop the flow through a line from the master cylinder in the event such line should become disconnected or ruptured.

The invention consists in the details of construction and in the combination and arrangement of the several parts of my improved hydraulic brake whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan and of somewhat a diagrammatic character illustrating a hydraulic brake constructed in accordance with an embodiment of my invention;

Figure 2 is a fragmentary view partly in section and partly in elevation of the master cylinders and the parts directly associated therewith;

Figure 3 is a fragmentary view partly in section and partly in elevation illustrating the indicating means associated with the supply tank;

Figure 4 is an enlarged fragmentary view partly in section and partly in elevation of the control valve as herein set forth;

Figure 5 is a fragmentary transverse sectional view taken through a portion of the structure illustrated in Figure 4 and illustrating in detail the slide valve;

Figure 6 is a transverse view in top plan illustrating a brake unit as herein embodied;

Figure 7 is a view partly in section and partly in side elevation of the structure as illustrated in Figure 6, the section being taken substantially on the line 7—7 of Figure 6.

As disclosed in the accompanying drawings, T denotes a tank of requisite dimensions adapted to be mounted on the dash or other convenient point upon a vehicle body, said tank being provided with a filling vent 1 having disposed therethrough a restricted port *a* affording communication from within the tank to the atmosphere. The tank T feeds by gravity through the tube 2 to the master cylinder C, said tube having interposed therein, at a point in relatively close proximity to the cylinder C, a check valve 3 herein disclosed as a ball type to prevent retrograde flow through the tube 2.

Each of the supporting wheels W for the vehicle carries a brake drum B with which is associated a brake band 4, said band intermediate its ends being operatively engaged, as at 5, with an outstanding arm 6 carried by the plate or disc 7 carried by the rear axle housing 8 or a front steering pedal 9.

The free end portions of the band 4 are operatively engaged with the outer end portions of the rock arms 10, said arms being supported substantially midway their ends, as at 11, for swinging movement by the adjacent plate or disc 7. The inner end portion of one of the arms 10 is operatively connected, as at 12, with the closed end portion of a cylinder 14 and the inner end portion of the second arm 10 is operatively connected, as at 15, with the outer end portion of the rod 16 associated with the piston 17 working in the cylinder 14. As the cylinder 14 is forced outwardly the inner end portions of the arms 10 will have separating movement resulting in the outer end portions having movement one toward the other and thereby causing the band 4 to have requisite braking action upon the drum B.

In the present embodiment of my invention, the brake mechanisms associated with the front wheels are adapted to operate in unison or as a unit while the mechanisms associated with the rear wheels are also adapted to operate in unison or as a unit.

Leading from the cylinders 14 comprised in the rear unit are the pipes 18, the communication of each of said pipes with its associated cylinder 14 being inwardly of the piston 17 as is particularly illustrated in Figure 7 of the drawings. The pipes 18 are in communication, through the cylinder pipe 19 with the master cylinder C at a point inwardly of the piston 20 working therein.

Associated with the piston 20 is the rod or stem 21 which extends exteriorly of the cylinder C, said extended portion of the rod or stem 21 being operatively engaged, as at 22, with a depending tail piece or arm 23 carried by the pivoted end portion of the pedal 24. As herein disclosed, the pedal 24 is pivotally engaged with a rod 25 supported by and bridging the space between the outstanding brackets 26 herein disclosed as fixed to the adjacent head 27 of the cylinder C.

Interposed between the piston 20 and the outer head 27 of the cylinder C is a spring 28 encircling the stem or rod 21, said spring operating to exert slight pressure upon the piston 20 when the brake unit is in release.

When it is desired to apply the rear brake unit, pressure is imposed upon the pedal 24 moving the same forward and which action causes the piston 20 to move inwardly of the cylinder C. As the fluid in the master cylinder C, the pipes 19 and 18 and the cylinders 14 has no means of escape, such pressure exerted on the fluid by the piston 20 will be immediately transmitted to the piston 17, causing said piston 17 to move outwardly and thereby contracting the bands 4 and bringing the same into desired braking action upon the drums B. When the pressure is released from the pedal 24, the springs 29 associated with each of the bands 4 will expand forcing the band 4 away from the associated drum B and at the same time moving the arms 10 in a direction to cause the associated piston 17 to move inwardly of its cylinder 14. This inward movement of each of the pistons 17 forces the fluid back to the master cylinder C and at the same time moving the piston 20 outwardly and in contact with the spring 29. The purpose of the spring 28 is to maintain a slight pressure on the fluid and to eliminate lost motion and to assure a quick application of the brake unit when necessary.

By pulling back on the pedal 24 the piston 20 will be caused to compress the spring 28 and at the same time create a partial vacuum permitting the fluid within the tank T to flow into the cylinder C whereby is assured the proper filling of the cylinder C. When the pull upon the pedal 24 is released the spring 28 will expand and cause the piston 20 to create slight pressure on the fluid therein which will hold the check valve 3 closed and thereby prevent retrograde flow through the tube 2.

In communication with each of the cylinders 14 comprised in the front unit in the same manner as hereinbefore set forth with respect to the rear unit, is a pipe 18' also in communication through the pipe 19' with the main cylinder C inwardly of the piston 20 working therein.

Comprised in the pipe 19' is an elongated casing 30 in direct communication with the cylinder C and which has its outer end closed by the plug 31 threaded therein. The casing 30 is provided intermediate its ends with an eduction port 32 normally closed by a slide valve 33. The valve 33 is provided with the upstanding and transversely spaced arms 34 having their upper end portions connected by a pin 35. Carried by the pin 35 is a spring 36 herein disclosed as substantially U-shaped in form and having its extremities contacting with the inner face of the casing 30 and serving to constantly urge the valve 33 into close contact with its runway 37.

Disposed between the arms 34 is a rod 38 provided with the longitudinally spaced enlargements 39 arranged fore and aft of the arms 34 for contact therewith whereby moving of the rod 38 is either direction will impart corresponding movement to the valve 33.

The inner end portion of the rod 38 carries a piston 40 snugly fitting within the enlarged inner portion 41 of the bore of the casing 30, such enlargement providing an annular stop shoulder 42 whereby the movement of the piston 40 is limited in one direction.

Overlying the inner face of the plug 31 is a disc or plate 43 having at substantially its axial center an outstanding stem 44 freely disposed through the plug 31 and interposed between the piston 40 and said plate 43 is an expansible member 45, herein disclosed as a coil spring, said spring serving to normally maintain the valve 33 in its closed position, the tension of said spring being regulated as required by requisite adjustment of the plug 31. It is generally intended that the tension of the member or spring 45 be sufficient to withstand the initial pressure exerted by the piston 20 to set the rear brake unit so that said rear brake unit is caused to function before the front unit is brought into action. As the pressure upon the piston 40 is increased, the same will move outwardly and cause the valve 33 to assume an open position whereupon the front unit will be caused to operate. The pressure at which the valve 33 may be caused to move into open position may be regulated or controlled upon proper adjustment of the plug 31.

By the provision of the valve 33, the front axle and the parts associated therewith are relieved of the severe strain during a braking operation by having the application first made on the rear wheels. It is possible upon proper adjustment of the plug 31 to hold the front unit from functioning except in the event of an emergency and then when increased pressure is applied to the pedal 24 this emergency braking is accomplished without any particular thought on the part of the driver.

Interposed in each of the pipes 19 and 19' is a casing S comprised in the automatic valve structure provided with an internal valve seat 46 with which coacts the valve 47 carried by the stem 48. The stem 48 is operatively engaged with a link 49 pivotally supported substantially intermediate its ends for swinging movement. The link 49 is also operatively engaged with a stem 50. A supplemental casing S' is carried by and in communication with the casing S and intersecting the casing S' is a diaphragm 51 to the central portion of which is secured the stem 50, said stem being of a length to extend within the casing S to effect the desired operative connection with the link 49. The stem 50 has associated therewith the stem or rod 52 providing means whereby the stem 50 may be manually adjusted.

The form of automatic valve structure herein disclosed, is described in detail and claimed in my application for patent filed December 22, 1923, Serial No. 682,241.

The casing S interposed in the pipe 19' is directly connected, as illustrated in Figure 4, with the casing 30 hereinbefore referred to.

The outer end portions of the pipes 18 and 18' are herein disclosed as constituting a flexible hose or conduit 18ᵃ.

In the event a pipe line 18 or 18' or a pipe 19 or 19' should become ruptured or disconnected, the automatic valve structure interposed in the corresponding pipe 19 or 19' will close, the resultant reduction of pressure in advance of such structure will result in the valve 47 automatically moving to its seat and thereby preventing the second unit from becoming inoperative.

The tank T has arranged therein a float 53 operatively engaged with an index or pointer 54 carried by the instrument board D or the like to regulate the rise or fall of the fluid in the supply tank at all times.

From the foregoing description it is thought to be obvious that a hydraulic brake constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination, a plurality of braking units, a cylinder, a separate communication between the cylinder and each of the units, a piston working within said cylinder, means associated with the piston for imposing requisite pressure upon the fluid, and means interposed in the connection between the cylinder and one of the units for normally closing the flow through such connection.

2. In combination, a plurality of braking units, a cylinder, a separate communication between the cylinder and each of the units, a piston working within said cylinder, means associated with the piston for imposing requisite pressure upon the fluid, a casing interposed in the connection between the cylinder and one of the units, a valve working within said casing and normally closing the flow through said connection, said valve automatically moving into open position upon pressure created by the piston in the cylinder.

3. In combination, a plurality of braking units, a cylinder, a separate communication between the cylinder and each of the units, a piston working within said cylinder, means associated with the piston for imposing requisite pressure upon the fluid, a casing interposed in the connection between the cylinder and one of the units, a valve working within said casing and normally closing the flow through such connection said valve automatically moving into open position upon pressure created by the piston in the cylinder, and means associated with the valve to determine the degree of pressure required to move said valve into open position.

4. In combination, a plurality of braking units, a cylinder, a separate communication between the cylinder and each of the units, a piston working within said cylinder, means associated with the piston for imposing requisite pressure upon the fluid, a casing interposed in the connection between the cylinder and one of the units, a valve working within said casing and normally closing the flow through such connection, said valve automatically moving into open position upon pressure created by the piston in the cylinder, and regulatable means associated with the valve to determine the degree of pressure required to move said valve into open position.

5. In combination, a plurality of braking units, means for setting each of the units, a manually operated member, a confined liquid movable upon operation of said manual member to cause the first named means to set the braking units, and means coacting with one of the units for retarding its application with respect to the remainder of the units until the pressure transmitted by the fluid reaches a predetermined degree above the degree of pressure required to set said remainder of the units.

6. In combination, a plurality of braking units, means for setting each of the units, a manually operated member, a confined non-compressible liquid movable upon operation of said manual member to cause the first named means to set the braking units, and means coacting with one of the units for retarding its application with respect to the remainder of the units until the pressure transmitted by the fluid reaches a predetermined degree above the degree of pressure required to set said remainder of the units.

In testimony whereof I hereunto affix my signature.

CHARLES F. MATTINGLY.